June 19, 1951 P. C. McLEMORE ET AL 2,557,303
FLAME CHOPPER FOR ROW CROPS
Filed Nov. 27, 1944 3 Sheets-Sheet 1
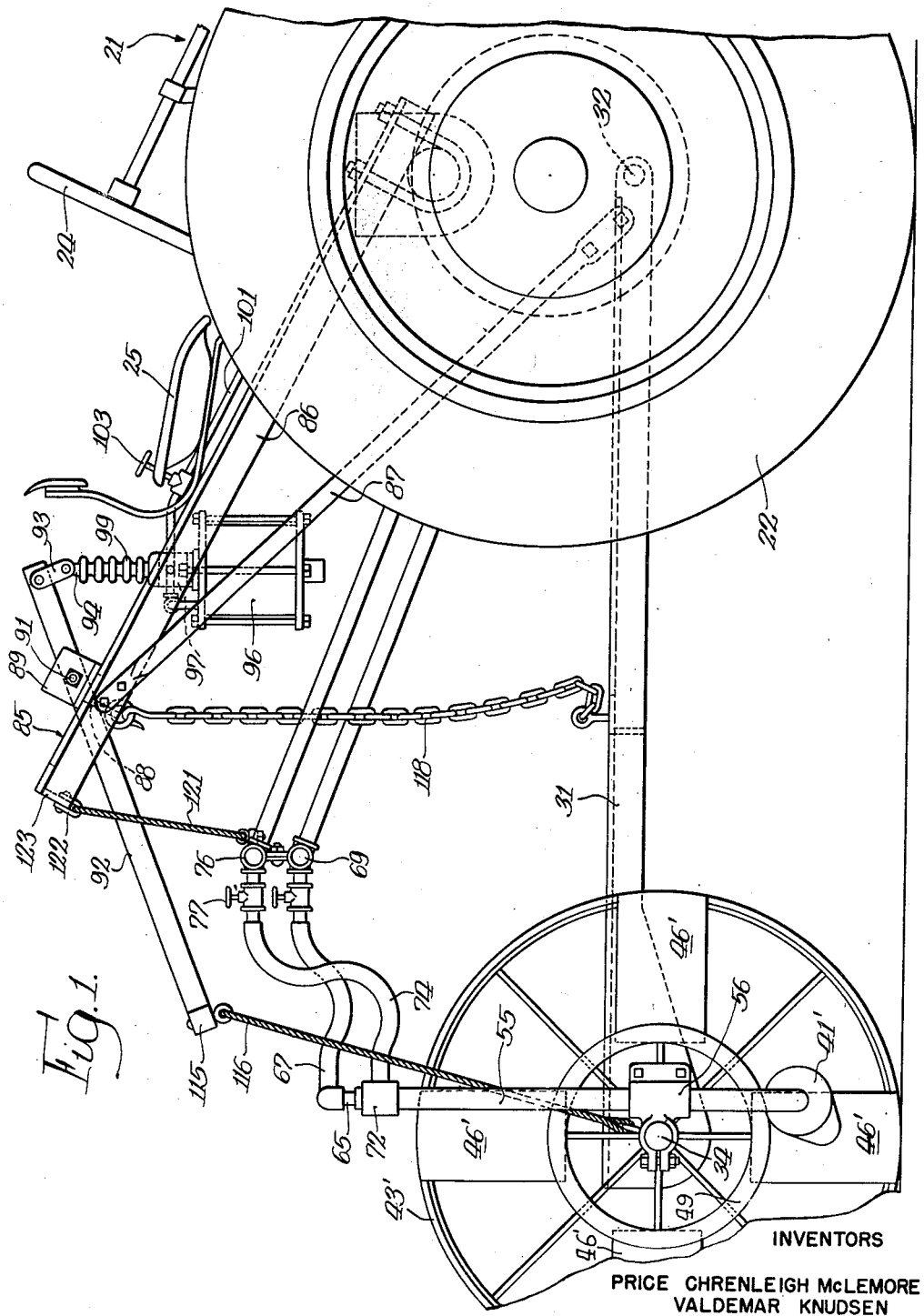
INVENTORS
PRICE CHRENLEIGH McLEMORE
VALDEMAR KNUDSEN
BY Brown, Jackson, Boettcher & Dienner
ATTORNEYS

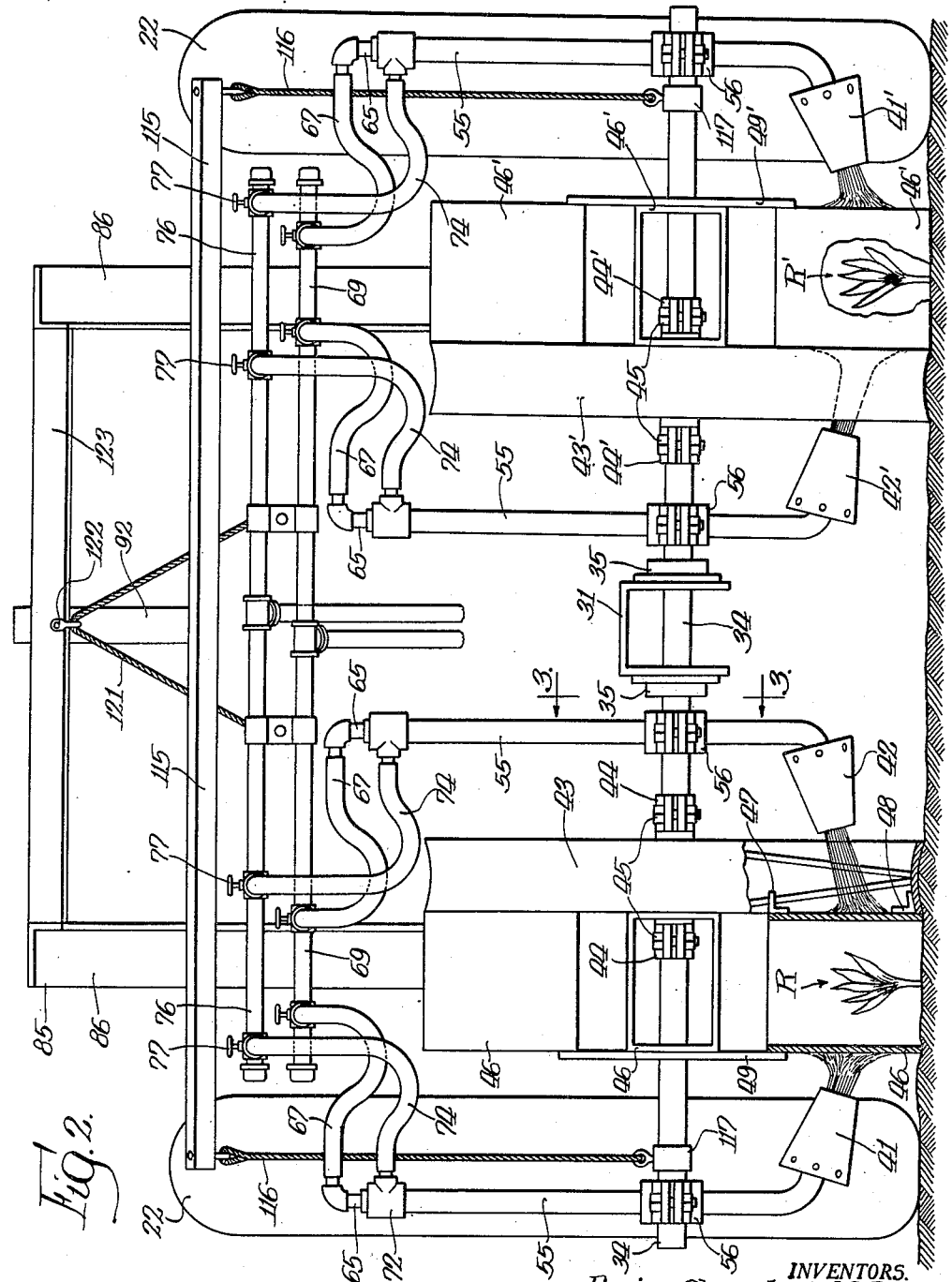

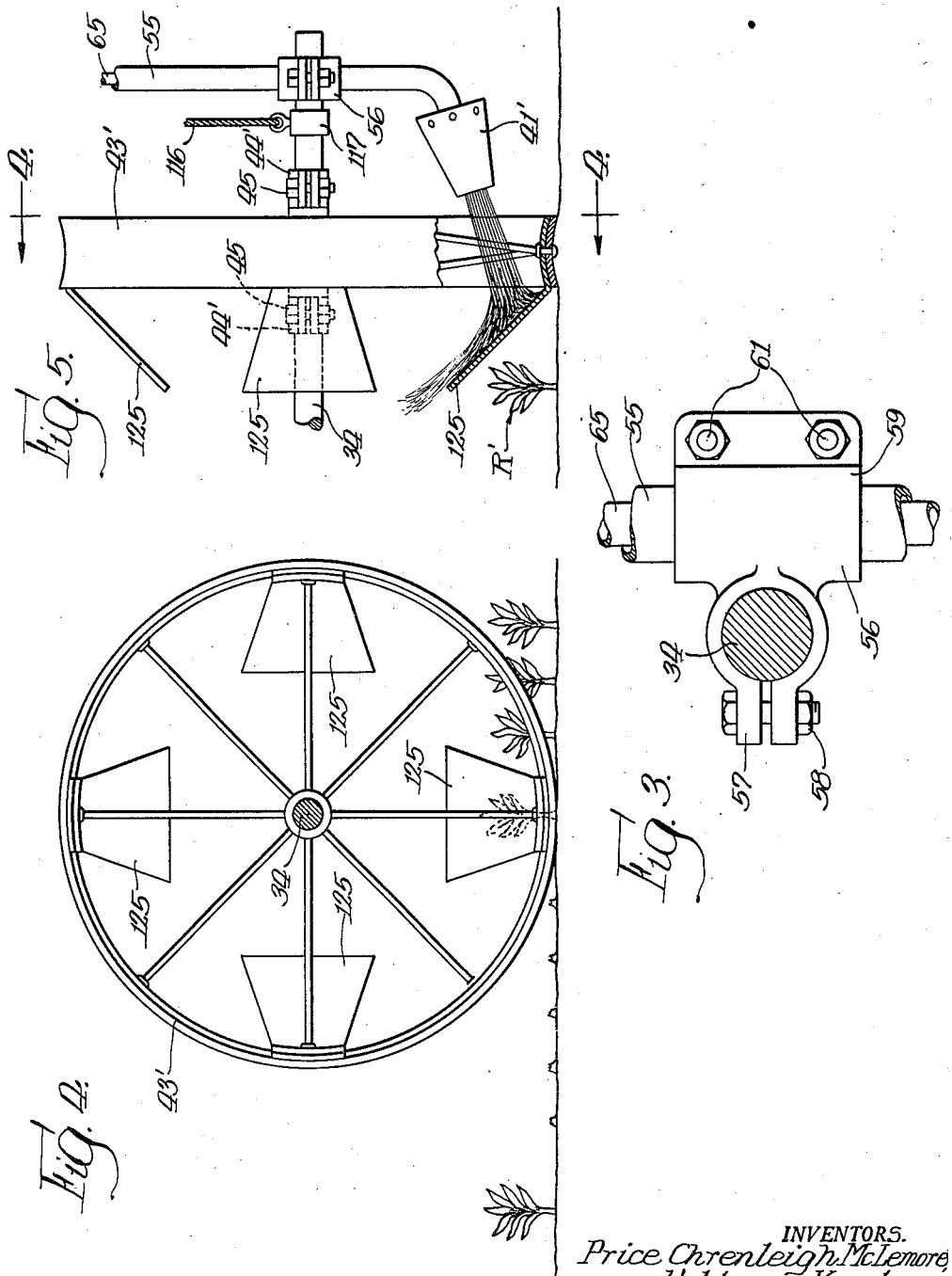

Patented June 19, 1951

2,557,303

UNITED STATES PATENT OFFICE 2,557,303

FLAME CHOPPER FOR ROW CROPS

Price Chrenleigh McLemore, Montgomery, Ala., and Valdemar Knudsen, Labadieville, La.; said Knudsen assignor, by mesne assignments, to Flame Cultivation, Incorporated, a corporation of Maryland Application November 27, 1944, Serial No. 565,302

5 Claims. (Cl. 97—22)

The present invention relates to flame chopping of crops or, more particularly stated, to the method of thinning out surplus young plants in a drilled crop row by the intermittent application of flame to the row.

In the planting of many different crops where the seed is planted substantially continuously or close together in a drill row, there occurs an excessive amount of sprouting as a result of seed germination. The small seedlings or plants compete amongst themselves for growing space, and were a considerable number of them not eliminated the resultant plants would be materially stunted and give an inadequate yield of crops. The removal of this excessive sprouting of small plants is usually accomplished by what is known as chopping or thinning, which is generally done by hand labor with a hoe, so as to cut away all but the plants which are selected to remain. In chopping or thinning to a stand of say ten or twelve inches, only plants about ten or twelve inches apart are allowed to stand and all intervening plants are chopped out. This gives the remaining plants greater room for growth and a greater area of soil from which to draw nourishment.

This chopping or thinning operation is an arduous and costly task. Such is particularly true in the case of cotton. Cotton can be planted in various ways but the general practice is to use a strewer plate in the planter which puts out a continuous stream of seed of approximately five seed per inch. When the cotton has sprouted and appears above the ground, hand-hoed labor is utilized to reduce the number of plants to about three plants per hill. The hills are spaced according to the individual planter's ideas, which may vary from eight to seventeen inches apart. This hand chopping operation represents a substantial part of the cost of growing cotton, and requires labor which may not be available at the time. Our invention has been developed primarily for the chopping of cotton, but it is applicable to the chopping or thinning of other crops as well.

According to the preferred practice of our invention, this flame chopping is performed by disposing burners to project flames into the plant row, moving the burners so disposed along the plant row at a substantially uniform speed, and at regular intervals along the row momentarily preventing the flames from striking the plants in the row, whereby all intervening plants are burned but these protected plants at regular intervals are not burned but remain to become the crop bearing stand along the row. The invention can be practiced by hand, wherein a single burner is manually carried and manually manipulated to burn the plants along the row at regular intervals so as to leave the desired crop bearing plants in spaced stands. However, in the commercial adaptation of the invention, the burners are mounted on a vehicle, such as a tractor or any horse drawn vehicle. The burners are preferably arranged to project their flames substantially crosswise of the plant row from opposite sides thereof, and there may be two or more pairs of these burners for flame chopping two or more plant rows simultaneously. In the preferred embodiment of the invention herein disclosed, the means for preventing the burning of plants at spaced intervals along the row comprises a wheel which rolls along the ground to one side of the plant row and carries a circularly arranged series of protective housings or shields which rotate with the wheel at one side thereof and are thereby rotated down successively into protective positions relatively to the plants at spaced intervals along the row. These ground engaging wheels with their protective housings can be lifted up out of engagement with the ground to facilitate turning the vehicle at the ends of the rows, and also to place the flame chopping apparatus in an inoperative position for traveling to and from the field.

The present invention is indirectly related to the art of flame cultivation as exemplified in McLemore Patents No. 2,327,204, No. 2,369,154 and 2,408,328 and in McLemore and Knudsen Patent 2,391,027. In flame cultivation and in flame chopping the flames are used to destroy or impair vegetation in the plant row; the difference being that in flame cultivation the flames destroy or impair parasitic vegetation in the plant row whereas in flame chopping the flames destroy plants at spaced intervals along the row, this operation being performed only once, however, along that row. In the accompanying drawings illustrating the preferred embodiment of our invention we have employed a considerable part of the structure disclosed in our above mentioned Patent 2,391,027, particularly with regard to the apparatus for supporting the burners and the wheels which carry the protective housings. In these drawings:

Figure 1 is a fragmentary side elevational view of our improved flame chopping apparatus wherein the burners and the shielding wheels are connected to the rear of a farm tractor;

Figure 2 is a rear elevational view showing two pairs of burners and two shielding wheels for performing flame chopping operations simultaneously on two adjacent plant rows;

Figure 3 is a detail sectional view taken approximately on the plane of the line 3—3 of Figure 2; and Figures 4 and 5 are fragmentary side and rear views respectively of a modified construction in which the shielding is done by deflecting baffles or vanes rather than by boxes, Figure 4 corresponding to a section taken on the plane of the line 4—4 of Figure 5.

Referring now to the improved form of apparatus shown in the drawings, the preferred form of vehicle for propelling the burners along the plant rows consists of a farm tractor 21 of any conventional construction, although it will be understood that other cultivating vehicles might be employed, either self propelled or animal drawn. The tractor 21 is shown as comprising large driving wheels 22 at the rear, and small driving wheels, not shown, at the front. The front steering wheels are controllable through the conventional steering control wheel 24 disposed adjacent to the driver's seat 25. The vehicle is shown as being used for simultaneously chopping two spaced rows R, R' (Figure 2) of any drilled crop plants. In the tractor shown the tread spacing between the rear wheels 22 is sufficient for spanning the two plant rows. The tread spacing between the front wheels may also be sufficient to span the two plant rows, or, alternatively, the tractor may be of the type having its front wheels disposed close together to run in the middle between plant rows. The selective speed transmission of the present day tractor usually affords a range of three or four selective speeds, and gives various working speeds of approximately one-half mile per hour up to four or five miles per hour, these being in the preferred range for flame chopping. The tractor is preferably provided with an automatic speed governor which can be set to maintain any desired engine speed corresponding to a selective tractor speed, as is well known in the art. A power take-off device driven by the power plant of the tractor serves to drive the compressor which supplies compressed air to the burners and to the power lift mechanism, all as illustrated and described in our aforementioned Patent 2,391,027, to which reference is made for these details.

The burners and the shielding wheels of the present invention are preferably coupled to the tractor through a draft tongue or beam 31 which extends rearwardly from the tractor directly in the center thereof, midway between the rear tractor wheels 22. The front end of this beam 31 is pivotally supported for vertical swinging movement around a transverse horizontal pivot 32 which is carried by the tractor frame or differential housing. This beam is shown in the form of a relatively wide downwardly facing channel, but it will be understood that it may be built up of laterally spaced bars or constructed in any other suitable manner. Secured to said beam near its rear end is a transversely extending axle shaft 34 which carries the burners and the shielding wheels. This shaft is rigidly secured in non-rotative relation to the beam 31 by heavy mounting brackets 35 which are bolted to the beam 31 and which comprise clamping portions rigidly clamped to the shaft. Referring to Figure 2, it will be seen that that portion of the shaft 34 which projects to the left from the draft beam 31 carries the outer and inner burners 41 and 42 and the shielding wheel 43 for the left hand plant row R, and that that portion of the shaft 34 which projects to the right from the draft beam 31 carries the outer and inner burners 41' and 42' and the shielding wheel 43' for the right hand plant row R'. In as much as the apparatus for operating on the right hand plant row is a duplicate of that employed for operating on the left hand plant row, the same reference numerals will be applied to the parts for the right hand row except that they will be given a prime suffix. The shielding wheels 43, 43' are freely rotatable on the shaft 34 between the pairs of adjustable stop collars 44, 44' which are fixedly secured to the shaft at different points by set screws, clamping screws, or the like. In the illustrated arrangement, the collars 44, 44' are shown in the form of split halves adapted to be frictionally clamped to the shaft by bolts 45, although holes might be provided in the shaft 34 at spaced points to receive through-bolts in different positions of adjustment. The spacing between rows R and R' may vary for different crops or different farms or different section of the country, but this variation of row spacing can be readily accommodated in various ways, such as by shifting the adjustable clamping collars 44, 44' inwardly or outwardly along the shaft 34 and thereby shifting the spacing between the shielding wheels 43, 43', or by reversing the position of the wheels 43, 43' so that their protective housings 46, 46' will be disposed on the inner sides of the wheels instead of the outer sides, or by performing both of these adjustments. Preferably, these wheels are adapted to roll along the ground just inside the plant rows so that the protective housings 46, 46' which are carried by the wheels and which are revolved down over spaced plants will be disposed on the outer sides of these shielding wheels. However, this arrangement might be reversed to accommodate different row spacing, as above described, either with or without shifting of the clamping collars 44, 44', etc. In the embodiment illustrated in Figures 1 and 2, these shielding housings are in the form of rectangular sheet metal boxes open at top and bottom and rigidly secured to the spokes and rims of their respective wheels. These boxes or housings are preferably of oblong end dimension so that a substantial lateral width is available for covering or reaching across the plant row even though there may be appreciable variations in the straightness of the plant row. The width of the box for covering fore and aft dimension in the plant row is sufficiently small so that only a relatively short length of the plant row is covered, i. e. enough to cover one plant or a relatively few plants, depending upon the crop and the size of the plants. The outer edges of the boxes or housings preferably lie substantially flush with the outer surfaces of the wheel rims 43, 43' so that the boxes will contact the ground or be forced slightly into the ground in covering their particular portions of the plant row. Lugs 47, 48 riveted or welded to the inner vertical walls of the boxes are welded to the spokes and to the rims of their respective wheels. A reinforcing ring 49 is welded to the outer vertical walls of the series of boxes so as to give support to the outer ends of the boxes. In the embodiment illustrated we have shown only four boxes mounted on relatively large wheels 43, 43', which will give a relatively long spacing between stands of the chopped or thinned plant row, but it will be understood that a greater or lesser number of these shielding boxes may be mounted on the wheels, and that the wheels may be of larger or smaller size, if desired. It will be understood that in the rolling motion of these wheels along the plant row the boxes carried thereby will be successively brought down into shielding relation over the plants at regularly spaced intervals along the plant row.

Referring now to the burners 41, 41' and 42, 42', each of these burners is preferably of the high pressure atomizing type, such as are illustrated and described in the aforementioned patent and pending applications. Compressed air is supplied to each burner at a pressure of preferably fifty pounds per square inch or higher, and this high pressure jet of air serves to exert a fine atomizing action on the liquid fuel for atomizing the fuel into extremely small vapor particles. The liquid fuel is preferably kerosene, furnace oil, distillate or any one of a wide range of fuel oils capable of being atomized and burned in this manner. The fuel may be fed to the burners under a relatively high pressure if desired, such as in the range of from 40 to 60 pounds per square inch. However, this is not essential, particularly if the compressed air supplied to the burners is under sufficient pressure, and in some instances we have supplied the fuel to the burners under relatively low pressures. Each burner is secured to the lower end of a pipe 55 which is adapted to have clamped attachment to the axle shaft 34 for mounting the burners. This clamped mounting is obtained by a friction clamp 56 which is best illustrated in Figure 3. It comprises a horizontally extending split section 57 which is clamped over the horizontal shaft 34, the two halves of this split section being drawn together by clamping screws or bolts 58. The clamp also comprises a vertically extending split section 59 which clamps over the upwardly extending burner pipe 55. The two halves of this vertically split section are clamped together over the burner pipe by clamping screws or bolts 61. It will be observed that this frictional mounting clamp 56 can be shifted inwardly or outwardly along the mounting shaft 34 for disposing its respective burner at different lateral positions, depending upon the spacing between the plant rows, the desired distance of the burner from the plant row, etc. It will also be noted that the burner pipe 55 can be adjusted upwardly or downwardly within the split section 59 of the mounting clamp, thereby enabling the burner to be adjusted to any desired vertical position for placing its flame at a higher or lower level relatively to the ground level and plant row. It should also be noted that the mounting clamp 56 and burner assembly can be swiveled as a unit in a fore and aft plane by rotating the clamping section 57 around the mounting shaft 34 prior to clamping this section to the shaft. This enables the burner to be swung to different fore and aft positions relatively to the shaft 34 and relatively to the position of its companion burner. Under most operating conditions, it is preferable to have the two burners 41, 42 or 41' 42' slightly offset or staggered with respect to each other in a fore and aft plane so that the flame from one burner intersects the plant row slightly in advance of the flame from its companion burner.

In the exemplary arrangement illustrated, the compressed air and the liquid fuel are both conducted down to the burner through the pipe 55. In such arrangement, another pipe 65 extends down centrally through the pipe 55 so as to form two concentric passageways down through the pipe 55. In the construction illustrated the liquid fuel is carried down through the central pipe 65 and the compressed air is carried down through the annular space surrounding the central pipe 65, although this arrangement may be reversed if desired. A flexible conduit or hose 67 has suitable connection with the upper end of each fuel pipe 65 and extends to a liquid fuel manifold 69. The upper end of the pipe 55 is closed off around the central pipe 65 by a coupling head 72, and extending from this coupling head is a flexible conduit or hose 74 which leads to a compressed air manifold 76. Hand regulating valves 77 are preferably interposed between the compressed air manifold 76 and each hose extension 74 for the purpose of regulating the pressure of the compressed air supplied to each burner, these regulating valves being all readily accessible to the driver from his seat on the tractor. The liquid fuel manifold 69 is connected to a liquid fuel reservoir mounted on the tractor; and a suitable filter or strainer may be interposed in the connection from the reservoir to the manifold 69. Whatever pressure is imposed on the liquid fuel can be applied directly to the interior of the liquid fuel reservoir. The compressed air manifold 76 is suitably connected with a compressed air tank also carried by the tractor. This compressed air tank is arranged to receive compressed air from a compressor which is driven from the power takeoff device of the tractor, as fully illustrated and described in the aforementioned copending applications.

During the travel of the implement to and from the field, and during the turning of the implement at the ends of the rows, it is desirable that the entire assembly of cross shaft 34, burners 41 and 42 and shielding wheels 43 be raised to inoperative position with the shielding wheels and their protective shields out of contact with the ground. For accomplishing this lifting operation we have illustrated power lift mechanism which is very similar to that disclosed in our copending application Serial No. 471,858. This lifting mechanism is supported on a jack-frame 85 which comprises two laterally spaced A-frames each consisting of an angle bar 86 and a tubular strut 87, both having their forward lower ends secured to the tractor frame. Extending transversely between the upper portions of the angle bars 86 is a cross connecting bar 88, to the central portion of which are secured two upwardly extending pivot brackets 89 carrying a transverse pivot bolt 91. Rockably supported on the pivot bolt 91 between the brackets 89 is a lifting beam 92. The forward end of the lifting beam is pivotally connected by a pair of links 93 with the upper end of an air lift plunger rod 94. This plunger rod carries a piston in its lower end which reciprocates vertically within a pneumatic power lift cylinder 96 which is supported from a transverse supporting bar 97 extending between the angle bars 86. An extensible boot or bellows 99 surrounds the upper portion of the piston rod 94 and prevents the entrance of dirt into the cylinder. A compressed air conduit 101 extends from the upper portion of the cylinder 96 to a control valve 103 and thence to a source of compressed air, such as the aforementioned compressed air reservoir. The valve 103 is arranged to be conveniently actuable by the operator from his position on the tractor seat 25. It will be understood that when the operator opens the control valve 103, compressed air will flow through conduit 131 to cylinder 96 for depressing the piston in the cylinder and thereby rocking the lifting beam 92 in clockwise direction to lift the rear end of the draft beam 31, the cross shaft 34, the shielding wheels 43, 43′ and the burners 41, 41′ and 42, 42′. The lifting beam 92 carries a transversely extending cross bar 115 at its rear end which is disposed substantially above and parallel with the cross shaft 34. Lengths of steel cable or chain 116 extend downwardly from the ends of this cross bar and have their lower ends secured to clamps 117 which are fixedly secured to the cross shaft 34. When the shielding wheels and burners are down in their normal position for performing their row chopping operations the cables or chains 116 hang down with sufficient slack in each so that the wheels 43, 43′ are free to rise and fall in following undulations in the ground. When it is desired to lift the shielding wheels and burners, as for turning at the end of the row, the admission of compressed air to the lifting cylinder 96 swings the cross bar 115 in an upward direction and lifts the draft beam 31, shaft 34, shielding wheels 43, 43′ and burners 41, 41′ and 42, 42′ to an elevated position clear of the ground. If it is desired to hold the parts in such raised position for a substantial period of time, without having to maintain air pressure in the cylinder 96, this can be readily accomplished by extending a chain or cable 113 directly from the draft beam 31 up to a point of attachment at the apex of the A-frames 86, 87; or, supplementary manually actuated lifting mechanism may also be provided which is operatively connected to the forward end of the lifting beam 92 and which is actuatable by the operator from his position on the tractor seat 25 for manually lifting the shielding wheels and burners and for locking them in their raised positions. If desired, the pivotal attachment of the forward end of the draft beam to the tractor at the pivot point 32 may be of such nature as permits a limited transverse rocking of the draft beam so as to accommodate more readily any rising and falling movement of one of the shielding wheels 43 or 43′ relatively to the other wheel in passing over rather rough ground. The transverse manifold pipes 69 and 76 may be supported in any suitable manner, such as by extending a cable 121 down from the central point of attachment 122 carried by a transverse bar 123 forming a part of the jack frame 85, the lower ends of this cable being secured to the manifolds, as illustrated in Figure 2.

The operation of this embodiment should be apparent from the preceding description. In brief, as the machine moves along the two plant rows, the blasts of flame from the burners 41, 42 and 41′, 42′ produce a searing and destroying action on the plants in the plant rows so long as these plants are not sheltered from the blasts of flame. The volume of flame from each burner, its intensity, and the proximity of the burner to the plant row, are so proportioned that the flames from the burners will destroy the small plants at the particular tractor speed which is predetermined or selected for this flame chopping operation. That is to say, the flames will exert this destroying action on all of the young plants which are not shielded or protected by the rotating shielding boxes 46, 46′. In the rotation of each shielding wheel 43, 43′, these boxes are successively revolved down and over the plants at spaced intervals along the plant rows, and when one of these protecting boxes rotates down over a plant that plant is effectively shielded or protected against the flames from each side projected from both the outer and inner burners. This is well illustrated in Figure 2, where a box 46 protecting a plant in the left hand row R is shown in vertical section, and where a box 46′ protecting a plant in the right hand row R′ is shown broken away to illustrate the plant. As previously remarked, for obtaining different spacing of the stands (i. e. the spacing between protected plants) a greater or lesser number of shielding boxes may be mounted on each shielding wheel, and each shielding wheel might be substituted by corresponding wheels of larger or smaller diameter. For adapting the machine to different row spacing between plant rows, the two shielding wheels may be shifted inwardly or outwardly along the transverse shaft 34 through appropriate adjustments performed on the clamping collars 44, 44′; or, as another possible manner of adjustment, these shielding wheels might be reversed so as to dispose their shielding boxes 46, 46′ on the inner sides of the wheels in order to accommodate a relatively narrow row spacing. In performing these transverse adjustments of the wheels, the burners 41, 42 and 41′, 42′ are of course also adjusted transversely through the medium of the mounting clamps 56. These mounting clamps enable the fore and aft positions of the two companion burners to be appropriately located so that each shielding box will afford the desired shielding protection to a plant as the box revolves down to a position intersecting the plant row and the transverse lines of the flames from the burners.

In Figures 4 and 5 we have illustrated a modified construction in which each shielding wheel 46, 46′ merely carries a series of deflecting baffles or vanes 125 which deflect the burner flame away from the plant or plants at the predetermined points along the plant row. These deflecting vanes are preferably in the form of wedge-shaped plates which are riveted or welded to the rim of the wheel 46′ at uniformly spaced points around the wheel, four of these vanes being shown, but it being understood that a greater or lesser number may be employed. As shown in Figure 5, the vanes are inclined toward the wheel axis 34 so that when they come down into registration with the plant row they function as intercepting barriers for deflecting the burner flame upwardly and over the plant or plants to be protected. In such embodiment, only one burner is employed because these protecting baffles 125 only afford protection against flames projected in one direction. However, two such wheels coupled together for joint rotation by an axle sleeve, and each wheel carrying its own series of inclined baffles, might be employed where it is desired to afford protection as opposite sides of the plant row for two-burner embodiments. The shielding wheels 46, 46′ can be adjusted transversely along the axle 34 by adjustment of the clamps 44, 44′ for the purpose of accommodating different row spacings, and the burners 41, 41′ can also be shifted laterally and fore and aft by manipulation of the mounting clamps 56, in substantially the same manner as described above of the preceding embodiment.

While we have illustrated and described what we regard to be the preferred embodiments of our invention, and the preferred methods of carrying the invention into effect, nevertheless it will be understood that such are merely exemplary and that numerous modifications and rearrangements may be made therein without departing from the essence of the invention.

We claim:

1. Flame chopping means adapted to be moved along a plant row by a vehicle, comprising the combination of a burner of the blast type projecting a relatively long large volume flame, means for supporting said burner at a substantially fixed height above the ground in position to project its flame crosswise of the plant row to destroy plants in said row, and means for intermittently shielding plants at spaced points along the row from said flame comprising a plurality of shielding boxes, together with means for causing said boxes to move down into protecting positions over the plants at spaced points along the row, each of said shielding boxes being of sufficient height to shield the entire height of the plant from flame impingement and including front and rear walls serving to shield the front and rear sides of the plant from being burned by the action of the flame fanning out forwardly and rearwardly along the plant row, each of said shielding boxes being of substantially oblong sectional shape with the wider dimension extending crosswise of the plant row to accommodate substantial variations in the straightness of the row.

2. Multiple row flame chopping means adapted to be moved along a plurality of parallel plant rows by a vehicle, comprising the combination of a transverse member adapted to have connection with the vehicle to be propelled thereby, a plurality of blast burners of the compressed air type connected with said transverse member in laterally spaced relation for projecting relatively long large volume flames crosswise of said plurality of plant rows, there being two of these burners projecting flames into each plant row from opposite sides thereof and offset with respect to each other in a fore and aft plane so that the flame from one burner intersects the plant row in advance of the flame from the companion burner, a plurality of ground engaging shielding wheels, one for each plant row, connected with said transverse member, a plurality of shielding boxes mounted at spaced points around each of said wheels adapted to move down into protecting positions over the plants at spaced points along the plant rows, said shielding boxes having front and rear and side walls whereby the shielded plants are protected on all sides from the burner flames fanning out front and rear from said offset burners, and adjustment means enabling said burners and said wheels to be adjusted transversely to different positions relatively to said transverse member so as to accommodate wider or narrower row spacing.

3. Multiple row flame chopping means adapted to be moved along a plurality of parallel plant rows by a vehicle, comprising the combination of a transverse member adapted to have connection with the vehicle to be propelled thereby, a plurality of pressure type blast burners connected with said transverse member in laterally spaced relation for projecting their flames crosswise of said plurality of plant rows, a plurality of ground engaging shielding wheels, one for each plant row, connected with said transverse member, a plurality of shielding boxes mounted at spaced points around each of said wheels adapted to move down into protecting positions over the plants at spaced points along the plant rows, whereby the shielded plants are protected from the burner flames, each of said shielding boxes being of sufficient height to shield the entire height of the plant from flame impingement and including front and rear walls serving to shield the front and rear sides of the plant from being burned by the action of the flames fanning out forwardly and rearwardly along the plant row, each of said shielding boxes being of elongated sectional shape with the wider dimension extending crosswise of the plant row so as to accommodate substantial variations in the straightness of the row and substantial variations in the row spacing, and adjustment means enabling said burners and said wheels to be adjusted transversely to different positions relatively to said transverse member so as to accommodate wider or narrower row spacing.

4. In a multiple row flame chopping implement adapted to be propelled by a tractor or the like, the combination of a transverse axle shaft, draft means for connecting said axle shaft with the tractor, laterally spaced ground engaging wheels rotatably mounted on said axle shaft, adjustable retaining means on said axle shaft enabling each wheel to be shifted along said axle shaft to different transverse positions to accommodate wider or narrower row spacing, adjustable mounting clamps mounted on said axle shaft on opposite sides of each wheel, compressed air blast burners carried by said mounting clamps projecting flames into each plant row from opposite sides of the row for destroying plants in the row, the burners projecting flames into each plant row from opposite sides thereof being offset with respect to each other in a fore and aft plane so that the flame from one burner intersects the plant row in advance of the flame from the companion burner, said adjustable mounting clamps enabling said burners to be shifted along said axle shaft to different transverse positions to accommodate wider or narrower predetermined row spacing, and shielding boxes carried by said wheels at spaced points around their peripheries adapted to revolve down into protecting positions over the plants at spaced points along the rows, each of said shielding boxes being of sufficient height to shield the entire height of the plant from the flames projected inwardly from opposite sides of the plant row, and including front and rear walls serving to shield the front and rear sides of the plant from being burned by the action of the flames fanning out forwardly and rearwardly from the two offset burners associated with each plant row, each of said shielding boxes being of oblong sectional shape with the wider dimension extending crosswise of the plant row to accommodate substantial variations in the straightness of the plant row.

5. In a multiple row flame chopping implement adapted to be propelled by a tractor or the like, the combination of a lifting frame member adapted to be rigidly connected to or carried by the tractor vehicle, a transverse axle shaft, draft means for connecting said axle shaft with the tractor, means connected between the lifting frame member and said transverse axle shaft for lifting the latter so that it can be carried by the vehicle, laterally spaced ground engaging wheels rotatably mounted on said axle shaft, adjustable retaining means on said axle shaft enabling each wheel to be shifted along said axle shaft to different transverse positions to accommodate wider or narrower row spacing, adjustable mounting clamps mounted on said axle shaft on opposite sides of each wheel, compressed air blast burners carried by said mounting clamps projecting flames into each plant row from opposite sides of the row for destroying plants in the row, the burners projecting flames into each plant row from opposite sides thereof being offset with respect to each other in a fore and aft plane so that the flame from one burner intersects the plant row in advance of the flame from the companion burner, said adjustable mounting clamps enabling said burners to be shifted along said axle shaft to different transverse positions to accommodate wider or narrower predetermined row spacing, and shielding boxes carried by said wheels at spaced points around their peripheries adapted to revolve down into protecting positions over the plants at spaced points along the rows, each of said shielding boxes being of sufficient height to shield the entire height of the plant from the flames projected inwardly from opposite sides of the plant row, and including front and rear walls serving to shield the front and rear sides of the plant from being burned by the action of the flames fanning out forwardly and rearwardly from the two offset burners associated with each plant row, each of said shielding boxes being of oblong sectional shape with the wider dimension extending crosswise of the plant row to accommodate substantial variations in the straightness of the plant row.

PRICE CHRENLEIGH McLEMORE.
VALDEMAR KNUDSEN.

REFERENCES CITED

The following references are of record in the file of this patent:

UNITED STATES PATENTS

| Number | Name | Date |
|---|---|---|
| 439,176 | Pace | Oct. 28, 1890 |
| 659,870 | Jones | Oct. 16, 1900 |
| 1,083,806 | Copeland | Jan. 6, 1914 |
| 1,088,969 | Cox | Mar. 3, 1914 |
| 1,111,655 | Jones | Sept. 22, 1914 |
| 1,663,249 | Graham | Mar. 20, 1928 |
| 1,754,083 | Collins | Apr. 8, 1930 |
| 1,964,465 | Haas | June 26, 1934 |
| 2,107,723 | White | Feb. 8, 1938 |
| 2,130,512 | Silver | Sept. 20, 1938 |
| 2,171,031 | Graham | Aug. 29, 1939 |
| 2,298,499 | Morkoski | Oct. 13, 1942 |
| 2,327,204 | McLemore | Aug. 17, 1943 |